United States Patent
Holzner et al.

(10) Patent No.: US 6,834,757 B2
(45) Date of Patent: Dec. 28, 2004

(54) ROLLER DRIVE UNIT

(75) Inventors: Richard Holzner, Rosenheim (DE); Stefan Michailov, Maisach-Gernlinden (DE); Matthias Urch, Egmating (DE)

(73) Assignee: Telair International GmbH, Hausham (DE)

( * ) Notice: Subject to any disclaimer, the term of this patent is extended or adjusted under 35 U.S.C. 154(b) by 0 days.

(21) Appl. No.: 09/832,649

(22) Filed: Apr. 11, 2001

(65) Prior Publication Data

US 2002/0023825 A1 Feb. 28, 2002

(30) Foreign Application Priority Data

Apr. 12, 2000 (DE) .......................................... 100 18 162

(51) Int. Cl.[7] .............................................. B65G 13/12
(52) U.S. Cl. ..................... 198/782; 198/722; 244/137.1
(58) Field of Search ............................... 198/722, 782; 244/137.1; 414/530, 533, 535

(56) References Cited

U.S. PATENT DOCUMENTS

| | | | |
|---|---|---|---|
| 3,631,964 A | 1/1972 | Hinman et al. | |
| 3,712,454 A | 1/1973 | McKee | |
| 5,022,513 A | 6/1991 | Huber | |
| 5,183,150 A | 2/1993 | Chary et al. | |
| 5,660,268 A | * 8/1997 | Paauwe et al. | 198/782 |
| 5,938,003 A | * 8/1999 | Huber et al. | 198/782 |
| 5,960,934 A | 10/1999 | Huber et al. | |
| 6,340,085 B1 | 1/2002 | Huber et al. | |

FOREIGN PATENT DOCUMENTS

| | | |
|---|---|---|
| DE | 41 02 424 A1 | 7/1992 |
| DE | 197 02 387 A1 | 7/1998 |
| DE | 197 19 161 A1 | 11/1998 |
| DE | 198 07 228 A1 | 9/1999 |

* cited by examiner

*Primary Examiner*—Joseph Valenza
(74) *Attorney, Agent, or Firm*—Merchant & Gould P.C.

(57) ABSTRACT

Roller drive units are used for conveying objects, in particular cargo containers, on a roller conveyor track of an aircraft. They comprise a drive motor, a planetary gear with an input connected to the drive motor and with a first as well as a second gear output. A drive roller is connected to the first gear output to propel the object and a lifting apparatus is connected to the second gear output to lift the drive roller out of a retracted resting position, in which the drive roller does not contact the object, into a raised operating position in which the drive roller can engaged with the object. A first brake is provided to slow down the drive roller and a second brake is provided to keep the lifting apparatus in position. To improve the traction characteristics and in particular to improve the force with which the drive roller can press against the object to be conveyed, the first and second brakes are constructed so as to be controllable.

8 Claims, 2 Drawing Sheets

ROLLER DRIVE UNIT

FIELD OF THE INVENTION

The invention relates to a roller drive unit for conveying objects and in particular to a roller drive unit for conveying cargo containers on a roller conveyor track of an aircraft.

DESCRIPTION OF THE PRIOR ART

Roller drive units of this type are used in particular for transporting items of freight that have been placed on roller-type conveyor tracks. Such items may comprise cargo containers or pallets. A preferred application of the type of roller drive unit disclosed here is in air freight loading systems where the unit is used to transfer containers into the cargo space of an aircraft and stow them for transport. Accordingly, the roller drive unit is installed in the aircraft itself.

When roller drive units of this kind are switched on, drive rollers of the unit are swiveled upward in such a way that they press against the bottom of a cargo container situated above them. This frictional contact enables the torque of the drive rollers to be transmitted to the floor of the cargo container, so that the drive rollers propel the container forward.

The intended field of application of the present invention presents many problems regarding the construction of such roller drive units. In particular, the drive roller must be pressed against the bottom of the container with sufficient force to ensure frictional engagement between the drive roller and the container, so that the torque made available by the drive roller is converted to a propulsive force.

German patent DE 198 07 228 A1 discloses a roller drive unit in which a separate motor is provided to lift the drive roller from a lower, resting position into an upper, operating position and to ensure frictional engagement with the container. This arrangement is relatively elaborate because it requires an additional electric motor.

Another "principle" widely employed for such roller drive units lies in the fact that the pressing force is "tapped off" from the torque of the motor, so that no separate electric motor is needed to lift the drive roller. A roller drive unit of this kind is disclosed, for example, in DE 41 02 424 A1. Here lifting of the drive roller is accomplished by a cam connected to one output of a planetary gear, the other output of which is connected to the drive roller. The drive roller is slowed down by a brake that rotates, to some extent, with it, so that a certain amount of torque acts on the cam. The torque available to propel an object on the roller conveyor track is thus reduced by the following brake.

DE 197 19 161 A1 discloses a roller drive unit wherein a first controllable brake is provided to slow down the lifting cam and a second controllable brake is provided to block the motor, so that the drive roller as a whole can be blocked in order to brake a container situated above it. In this roller drive unit a following brake is likewise provided, which slows down the driver roller so that when it is raised, a portion of the torque provided by the electric motor is diverted to the lifting cam.

The object of the present invention is to provide a simply constructed roller drive unit wherein the pressing force exerted by the drive roller can be reliably adjusted so that there is a corresponding improvement in the required traction properties.

SUMMARY OF THE INVENTION

According to the present invention there is provided a roller drive unit for conveying an object comprising a drive motor; a planetary gear with an input connected to the drive motor and with a first gear output and a second gear output; a drive roller, which is connected to the first gear output, to propel the object; a lifting apparatus connected to the second gear output, to lift the drive roller out of a retracted resting position, in which the drive roller does not contact the object, into a raised operating position in which the drive roller can engage the object; a first controllable brake to slow down the drive roller; and a second controllable brake to keep the lifting apparatus in place.

This design of roller drive unit makes it possible on one hand to utilize the entire driving force for lifting the roller drive unit, while on the other hand, when the roller drive unit is in the raised state, the entire driving force is used for propulsion. This is especially important in view of the fact that the roller drive units concerned here are intended to be installed in very confined surroundings and in a situation in which a high degree of reliability is simultaneously demanded.

Preferably, the first and the second brakes are electrically controllable, a generally available bus preferably being used for this purpose.

Preferably also, the first brake is connected to the drive roller by way of a first braking gear, by way of which the torque acting on the brake can be correspondingly reduced. This enables a high torque to be modulated under precise control with a relatively weak brake.

The first brake acts on the drive path between the output of the planetary gear and the drive roller. It can thus be brought into engagement at any desired position in the drive path. In a first preferred embodiment of the invention the brake is installed in the drive roller, which saves considerable space. The braking gear is also accommodated in the drive roller and is preferably designed as a planetary gear, which corresponds to the rotationally symmetric construction of the drive roller.

The second brake is preferably connected to the lifting apparatus by way of a second braking gear. Thus relatively high torques, which appear particularly at this site, can be absorbed with a simple and easily constructed brake.

The lifting apparatus can take the form of a crank, spindle or the like. Preferably, however, it comprises at least one rotatable cam, which lifts the drive roller directly or by way of a pivoted frame in which the drive roller is rotatably mounted. Such a construction is simple and of small size.

The lifting apparatus preferably comprises a device that acts on the drive roller to move it out of its operating position into its resting position, so that it is not only gravity that presses the drive roller downward when the motor is switched off.

In another embodiment of the invention a spring device with damping is provided at the lifting apparatus, which serves to allow a degree of movement of the drive roller even when the brake is blocked, so as to compensate for irregularities on the bottom of the object to be conveyed.

The brakes are preferably constructed as switchable brakes with a blocking position and a release position, which both simplifies the construction of the brakes and reduces wear and tear on them, while the degree of torque that can be supported is simultaneously higher than in the case of friction brakes.

A preferred embodiment of the invention will now be described with reference to the accompanying drawings.

DESCRIPTION OF A PREFERRED EMBODIMENT

Figure 1:
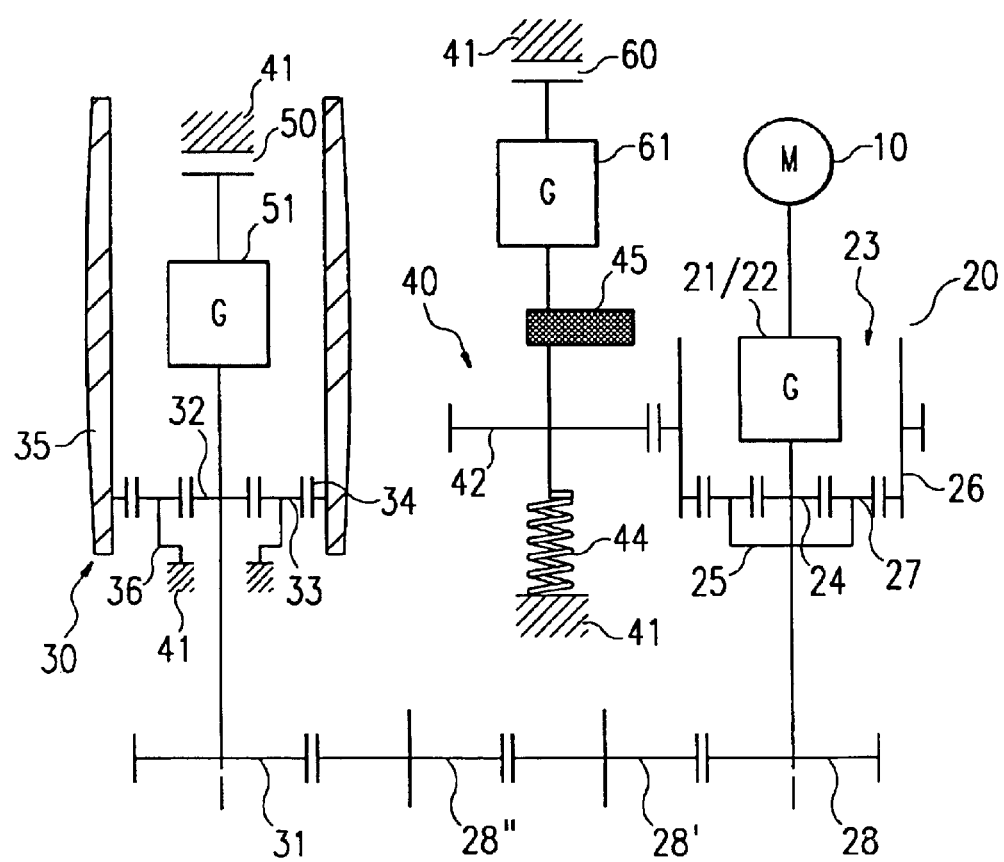
FIG. 1 is a diagram showing various components of an embodiment of a roller drive unit in accordance with the present invention.

In the following description, the same reference numerals are used for identical parts or parts with identical actions.

As shown in FIG. 1, an electric motor 10 is connected by way of a gear system 21/22 to a sun wheel 24 that forms the input to a planetary gear 20. Meshing with the sun wheel 24 are planet wheels 27 rotatably mounted on a planet carrier 25, which forms a first output of the planetary gear 20. The planet wheels 27 further mesh with an internal gearwheel 26 that forms a second output of the planetary gear 20.

The planet carrier 25 is connected, by way of transmission wheels 28, 28', 28", to a drive pinion 31 of a drive roller 30. Disposed in a casing 35 that is provided with a slip-proof outer coating is a sun wheel 32 of a reducing gear, which is nonrotatably connected to the drive pinion 31. On the sun wheel 32 run planet wheels 33, which are seated on a planet carrier 36 connected to a pivoted frame 41, which here is shown schematically merely as a "stationary connection". The planet wheels 33 further mesh with an internal gearwheel 34 nonrotatably fixed to the casing 35, so that a rotation of the drive pinion 31 is transmitted to the casing 35 by way of the sun wheel 32, the planet wheels 33 and the internal gearwheel 34.

The sun wheel 32 is also connected, by way of a first braking gear 51, to an electrically controllable brake 50, so that when the brake 50 is engaged, the sun wheel 32 is nonrotatably fixed to the pivoted frame 41 and hence the drive roller 30 as a whole is blocked.

On the outer surface of the internal gearwheel 26 of the planetary gear 20 are disposed teeth that mesh with a drive pinion 42 of a lifting apparatus 40. The lifting apparatus 40 comprises a lifting cam 45, which is rotatably mounted in the pivoted frame 41 and which is further connected by way of a second braking gear 61 to a brake 60, by way of which the lifting cam 45 can be nonrotatably fixed to the pivoted frame 41 when the brake 60 is engaged.

When the roller drive unit is started, at which time the drive roller 30 is in its lower, resting position, the first brake 50 is engaged whereas the second brake 60 is disengaged. Because the drive roller 30 and hence the first gear output, namely the planet carrier 25, are blocked in this way, the entire torque generated by the electric motor 10 acts on the lifting cam 45, so that the pivoted frame 41, which may be conventional and is not further described, is swung upward together with the drive roller 30, into the operating position. In this process a restoring spring 44, situated between the pivoted frame 41 and the lifting cam 45, is placed under tension.

As soon as a desired operating position is reached, the second brake 60 is engaged, so that the lifting cam 45 becomes blocked and keeps the drive roller 30 in that position. At the same time, and in certain circumstances somewhat earlier, the first brake 50 is disengaged, so that from then on the entire driving torque from the electric motor 10 acts on the drive roller 30, by way of the interposed gear units, and puts its casing 35 into rotation so as to propel a container. When the electric motor 10 is switched off, initially the drive roller 30 remains in its raised position; it stays there until the second brake 60 becomes disengaged. Then the restoring spring 44 moves the lifting cam 45 back into the position such that the drive roller 30 is in its resting position.

Figure 2:
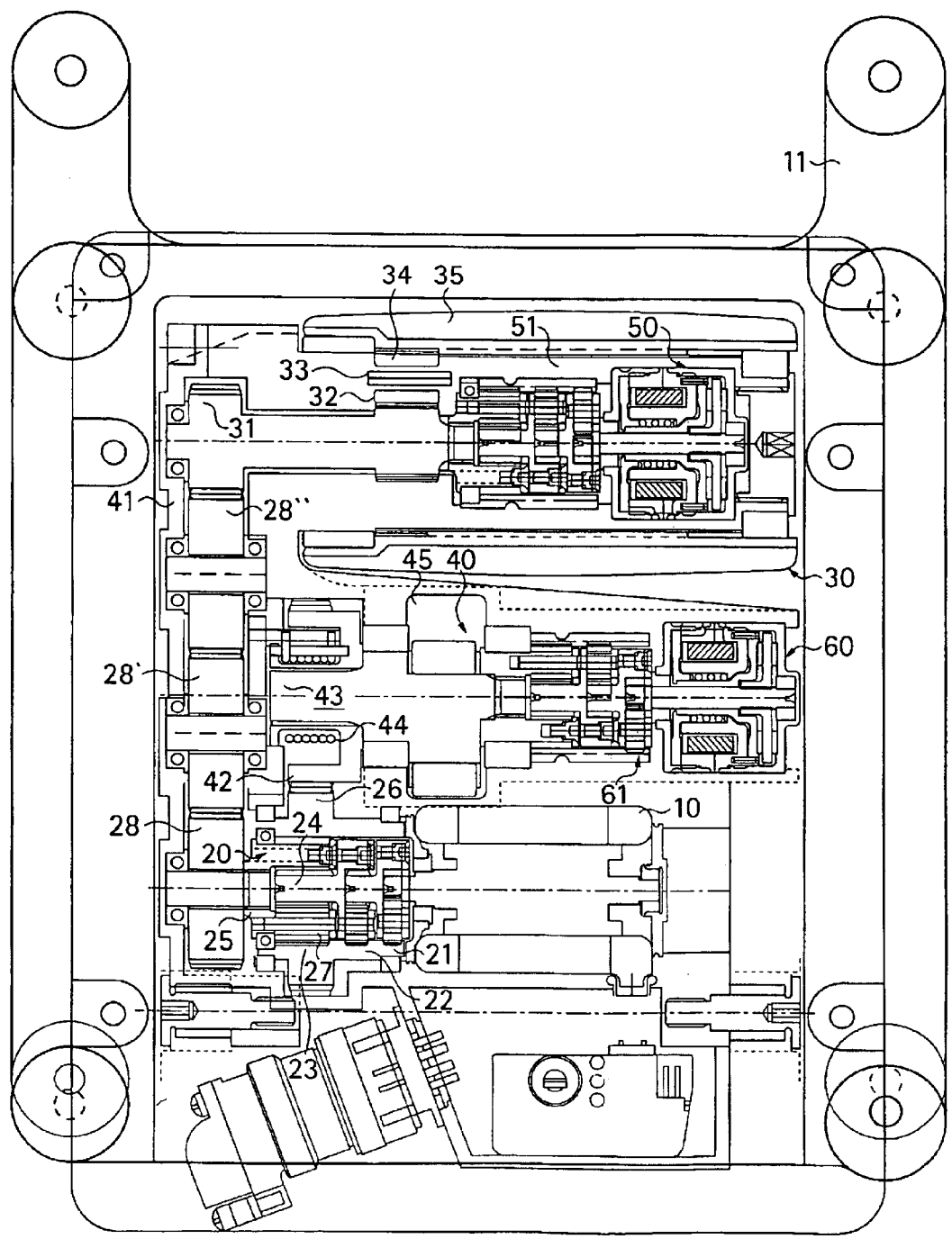
FIG. 2 is a partial transverse sectional view of the roller drive unit illustrated diagrammatically in FIG. 1.

An actual construction, such as is shown in FIG. 2, comprises a mounting frame 11 in which the pivoted frame 41 is disposed so that it can be swung upward.

The electric motor 10 is nonrotatably connected, by way of a first gear stage 21 and a second gear stage 22, planetary gears in each case, to the sun wheel 24 of a third gear stage 23. On the sun wheel 24 run planet wheels 27, which are rotatably seated on a planet carrier 25 and simultaneously mesh with an internal gearwheel 26, such that the planet carrier 25 forms the first output of the planetary gear and the internal gearwheel 26, its second output.

The planet carrier 25 is connected by way of transmission wheels 28, 28', 28" to a drive pinion 31 of a drive roller 30, which is rotatably disposed on bearings in the pivoted frame 41. The drive pinion 31 is seated on a shaft with a sun wheel 32 that meshes with planet wheels 33, which in turn mesh with an internal gearwheel 34 seated in a casing 35 of the drive roller 30. The planet wheels 33 are seated on a planet carrier 36, which is nonrotatably connected to the pivoted frame 41.

On the same shaft as the sun wheel 32 is seated an input of a first braking gear 51, the output of which is fixed to the input of an electromagnetic brake. Therefore when the brake 50 is engaged, the sun wheel 33, and hence the drive roller 30 as a whole, is blocked with respect to the pivoted frame 41.

The internal gearwheel 26, which forms the second output of the planetary gear 20, bears on its outer surface an arrangement of teeth that meshes with a drive pinion 42 of a lifting apparatus 40. This drive pinion 42 is seated on a shaft 43 on which a lifting cam 45 is nonrotatably seated and which extends further into a second braking gear 61, the output of which is connected to a second brake 60. When the second brake 60 is engaged, the lifting cam 45 is blocked with respect to the pivoted frame 41.

Furthermore, between the shaft 43 and the pivoted frame 41 a restoring spring 44 is provided, which applies to the lifting cam 45 tension directed toward its resting position, so that when the drive roller 30 is in the raised position and the motor 10 is turned off, the lifting cam 45 is rotated in such a way that the drive roller 30 sinks back into its resting position. The cam-lifting arrangement per se is sufficiently well known from the state of the art described at the outset, so that no further explanation is given here.

At this juncture it should be expressly pointed out that the arrangements of the brakes 50 and 60, within the drive roller 30 and/or coaxial with the lifting cam 45, merely represent preferred embodiments of the invention. It is also possible to provide corresponding brakes at other places in the two gear trains, between the first and second gear outputs and the drive roller or lifting cam.

What is claimed is:

1. A roller drive unit for conveying an object comprising:
   a drive motor,
   a planetary gear with an input connected to the drive motor and with a first gear output and a second gear output;
   a drive roller, which is connected to the first gear output, to propel the object;
   a lifting apparatus connected to the second gear output, to lift the drive roller out of a retracted resting position, in which the drive roller does not contact the object, into a raised operating position in which the drive roller can engage the object;
   a first electrically controllable brake to slow down the drive roller to cause the lifting apparatus to lift the drive roller out of the retracted position into the raised position and to be completely opened during propelling of the object without slowing down the drive motor; and a second electrically controllable brake to hold the lifting apparatus in the raised position.

2. A roller drive unit as claimed in claim 1, wherein the first brake is connected to the drive roller by way of a first braking gear in such a way as to reduce the torque acting on the first brake.

3. A roller drive unit as claimed in claim 2, wherein at least one of the first brake and the first braking gear is installed within the drive roller.

4. A roller drive unit as claimed in claim 1, wherein the second brake device is connected to the lifting apparatus by way of a second braking gear.

5. A roller drive unit as claimed in claim 1, wherein the lifting apparatus comprises at least one rotatable lifting cam, which raises the drive roller directly.

6. A roller drive unit as claimed in claim 1, wherein the lifting apparatus comprises at least one rotatable lifting cam, which raises the drive roller by way of a pivoted frame in which the drive roller is rotatably mounted.

7. A roller drive unit as claimed in claim 1, wherein the lifting apparatus comprises a means to lower the drive roller from the operating position into the resting position.

8. A roller drive unit as claimed in claim 1, wherein at least one of the first and the second brakes is constructed as a switchable brake with a blocking position and a release position.

* * * * *

UNITED STATES PATENT AND TRADEMARK OFFICE
CERTIFICATE OF CORRECTION

PATENT NO. : 6,834,757 B2  Page 1 of 1
APPLICATION NO. : 09/832649
DATED : December 28, 2004
INVENTOR(S) : Richard Holzner et al.

It is certified that error appears in the above-identified patent and that said Letters Patent is hereby corrected as shown below:

Title Page item 73 should read

Telair International GmbH
Bodenschneidstrasse,
D 83714
Meisbach, Germany

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 6,834,757 B2  
APPLICATION NO. : 09/832649  
DATED : December 28, 2004  
INVENTOR(S) : Richard Holzner et al.

It is certified that error appears in the above-identified patent and that said Letters Patent is hereby corrected as shown below:

Title Page item 73 should read

Telair International GmbH  
Bodenschneidstrasse,  
D 83714  
Miesbach, Germany

This certificate supersedes the Certificate of Correction issued October 7, 2008.

Signed and Sealed this

Twenty-eighth Day of April, 2009

JOHN DOLL  
*Acting Director of the United States Patent and Trademark Office*